(12) United States Patent
Bessho et al.

(10) Patent No.: US 6,605,750 B1
(45) Date of Patent: Aug. 12, 2003

(54) METHOD FOR DECOMPOSITION-TREATING ORGANIC HALOGEN COMPOUND AND DECOMPOSING DEVICE

(75) Inventors: Masahiro Bessho, Nagoya (JP); Toshio Hattori, Nagoya (JP); Yasuhiro Tsubaki, Nagoya (JP); Takayoshi Hamada, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/719,241

(22) PCT Filed: Apr. 12, 2000

(86) PCT No.: PCT/JP00/02368

§ 371 (c)(1),
(2), (4) Date: Dec. 8, 2000

(87) PCT Pub. No.: WO00/61286

PCT Pub. Date: Oct. 19, 2000

(30) Foreign Application Priority Data

| Apr. 12, 1999 | (JP) | 11-104611 |
| Apr. 12, 1999 | (JP) | 11-104612 |
| Apr. 12, 1999 | (JP) | 11-104613 |
| Apr. 28, 1999 | (JP) | 11-123160 |

(51) Int. Cl.[7] ............................................... A62D 3/00
(52) U.S. Cl. ................... 588/212; 204/169; 204/157.15
(58) Field of Search ................................. 588/208, 210, 588/211, 212, 227; 204/157.15, 164, 165, 169

(56) References Cited

U.S. PATENT DOCUMENTS

| 5,028,452 A | 7/1991 | Beatty | 427/41 |
| 5,541,386 A | * | 7/1996 | Alvi et al. | 219/121.38 |
| 5,965,786 A | 10/1999 | Rostaing et al. | 588/210 |
| 6,340,863 B1 | 1/2002 | Ikeda et al. | |

FOREIGN PATENT DOCUMENTS

| JP | 37-10879 | 5/1962 |
| JP | 60-112307 | 7/1985 |
| JP | 3-106416 | 5/1991 |
| JP | 3-295570 | 12/1991 |
| JP | 8-323133 | 12/1996 |

OTHER PUBLICATIONS

Machine Translation of JP 08–323133, Dec. 1996, pp. 1–4.*
Patent Abstract of Japanese Laid Open Application No. 05227517; published Mar. 28, 1995.
Patent Abstract of Japanese Laid Open Application No. 07308952; published Jun. 6, 1997.

* cited by examiner

Primary Examiner—Steven Bos
Assistant Examiner—Anthony Kuhar
(74) Attorney, Agent, or Firm—Scully, Scott, Murphy & Presser

(57) ABSTRACT

A product gas generated through the decomposition reaction of organohalogen compounds and steam is neutralized with an alkali solution and is left to stand for a predetermined period of time, while a neutralization product generated in this neutralization reaction is caused to precipitate in the alkali solution and is then removed. In order to remove the neutralization product completely, a takeout tube 71 is disposed to plunge into a waste gas processing tank 41 and a disk-shaped plate 71a is fastened at the distal end of the takeout tube 71 in parallel to the bottom surface of the waste gas processing tank 41, while the takeout tube 71 opens in the lower surface of the plate 71a at the center thereof. Thus the solid-liquid separation efficiency of the neutralization product and the alkali solution is improved and the quantity of alkali solution remaining in the neutralization product that is disposed of as waste is decreased.

6 Claims, 13 Drawing Sheets

METHOD FOR DECOMPOSITION-TREATING ORGANIC HALOGEN COMPOUND AND DECOMPOSING DEVICE

TECHNICAL FIELD

The present invention relates to a technique of decomposing organohalogen compounds by using plasma and, more particularly, to a method of and an apparatus for generating plasma by means of microwaves.

BACKGROUND OF THE INVENTION

Organohalogen compounds such as CFCs (flon), trichloromethane and halon that include such elements as fluorine, chlorine and bromine in the molecule thereof are used in large quantities in broad applications including refrigerants, solvents and fire extinguishers, and have very high practical values for industrial applications.

However, these compounds have high volatility and may have adverse effects on the environment such as generation of carcinogens and destruction of the ozone layer, when released to the atmosphere, soil, or waters without proper treatment. Thus, the organohalogen compounds must be processed for neutralization in order to protect the environment.

Known methods of the prior art for processing the organohalogen compounds mostly utilize the reaction of decomposition at high temperatures. These treatment processes are roughly divided into burning process and plasma process. In the burning process, organohalogen compounds are burned together with ordinary wastes such as resin.

In the plasma process, the organohalogen compounds are caused to react with steam in plasma thereby to decompose into carbon dioxide, hydrogen chloride and hydrogen fluoride. A method of generating high-frequency plasma by using a high-frequency power source to decompose the organohalogen compounds is proposed in Japanese Patent Application No. Sho 63-284098 (Japanese Patent No. 2134675). A method of generating arc plasma by using a DC power source and applying the plasma for decomposition is proposed in Japanese Patent Application No. Hei 7-3089452 and Japanese Patent Application No. Hei 7-332580.

As to an apparatus that utilizes plasma to decompose organohalogen compounds, an apparatus which utilizes microwave to generate plasma has recently been developed. This decomposition apparatus includes a waste gas processing tank that contains an alkali solution, a reactor tube disposed to open at the lower end thereof in the alkali solution, a circular waveguide that extends vertically above the reactor tube, a discharge tube disposed in the circular waveguide while the lower end thereof communicates with the reactor tube, a rectangular waveguide connected at a position near one end thereof to the circular waveguide and a microwave oscillator mounted on the other end of the rectangular waveguide.

In this decomposition apparatus, CFC gas and steam are supplied to the discharge tube and microwave generated by the microwave oscillator is transmitted through the rectangular waveguide to the circular waveguide. Electric field generated by the microwave inside the circular waveguide causes arc discharge, so that the CFC gas is decomposed by the thermal plasma in the reactor tube. Product gas generated in the decomposition reaction is neutralized while passing through the alkali solution. Other gas containing carbon dioxide is released through an exhaust duct.

Neutralization of the decomposition product gas generates neutralization products such as calcium chloride and calcium fluoride which precipitate in the form of slurry in the alkali solution. The alkali solution is returned to the waste gas processing tank to be reused. In this decomposition apparatus, a solid-liquid separator is installed in the waste gas processing tank where the neutralization product and the alkali solution are separated. The neutralization product separated from the alkaline solution is disposed of as waste.

The decomposition apparatus described above consumes a large quantity of water for cooling the reactor tube and other purposes, as well as the alkali solution. Thus it is desired to reduce the water consumption through improvement of the solid-liquid separation efficiency of the neutralization product and the alkali solution and by decreasing the amount of residual alkali solution included in the neutralization product to be discarded as waste.

While the decomposition apparatus described above has a mixer installed in the waste gas processing tank to mix the alkali solution, the mixer is of the ordinary propeller type that has twisted blades. This mixer can effectively mix the alkali solution, but hardly contributes to the breakdown of bubbles (dividing into fine bubbles) of the decomposition product gas released into the alkali solution, and is therefore not capable of increasing the contact area between the bubbles and the alkali solution. This leads to longer time required for the neutralization reaction and/or larger capacity required of the neutralization tank (waste gas processing tank). It may also result in the generation of acidic gas due to insufficient neutralization.

Moreover, in the decomposition apparatus described above, in case the product gas generated through decomposition of CFC gas is neutralized with the alkali solution over an extended period of time, capability of the alkali solution to neutralize decreases resulting in insufficient neutralization. When the rotation of a motor of the bubble breakdown means decreases the speed thereof or stops altogether for some reason, bubbles in the alkali solution cannot be broken sufficiently, thus resulting in insufficient neutralization. In this case, continuation of the decomposition may cause an acidic gas exhausted out.

The reactor of the apparatus described above includes the reactor tube located above and a blow tube connected to the bottom end of the reactor tube, so that the decomposition product gas (strongly acidic gas) of high temperature (around 1000° C., for instance) is blown into the alkali solution through this blow tube. For this reason, a metallic pipe having high heat resistance is normally used for the blow tube. However, when the blow tube is made of a metal, since the metallic pipe is not resistant to acid and alkali despite the high heat resistance, it must be frequently replaced thus leading to higher costs in the equipment and maintenance. When consideration is given only to the resistance to acid and alkali, use of a resin tube may be worthwhile but weak heat resistance thereof has been inhibiting the practical application.

DISCLOSURE OF THE INVENTION

The present invention has been made to solve the problems described above, and a first object thereof is to provide a method of reducing the water consumption in the organohalogen compound decomposition process and effectively and reliably feed CFC gas and other gases.

In order to achieve the object described above, first aspect of the present invention provides a method of decomposing organohalogen compounds by irradiating a gas containing organohalogen compound with microwave to generate thermal plasma, and reacting the organohalogen compounds with the steam in the thermal plasma, said method includes: neutralizing a product gas generated through the decomposition reaction of the organohalogen compounds and steam with an alkali solution, leaving to stand for a predetermined period of time to precipitate a neutralization product generated in this neutralization reaction in the alkali solution, and removing the neutralization product.

With this decomposition process, since leaving the alkali solution, wherein the decomposition product gas has been neutralized, to stand for a predetermined period of time causes the neutralization product to precipitate in the alkali solution, the neutralization product can be easily taken out and the solid-liquid separation efficiency of the neutralization product and the alkali solution can be improved. This makes it possible to improve the yield of recovering the alkali solution from the neutralization product for the purpose of effective reuse, while the quantity of the neutralization product to be disposed of is decreased.

In the decomposition process described above, after stopping the decomposing reaction between the organohalogen compounds and steam, the decomposing reaction may be restarted after removing the neutralization product left for the predetermined period of standing still. In this case, the rate of precipitation of the neutralization product, namely the rate of separation from the alkali solution, can be increased by interrupting the decomposing reaction between the organohalogen compounds and steam thereby suppressing the formation of the neutralization product.

The alkali solution recovered by separating the neutralization product may be reused in the neutralization reaction. In this case, water consumption in the decomposition process can be reduced by reusing the alkali solution separated from the neutralization product that has formerly been discarded.

A suspension may be used for the alkali solution. In this case, use of an alkali suspension containing alkaline substances in a high concentration accelerates the neutralization reaction even when the quantity of alkali solution is small compared to water solution.

The alkali solution may be a suspension containing 20% by weight of $Ca(OH)_2$. This constitution allows the neutralization reaction to proceed efficiently in a shorter period of time.

An apparatus for decomposing organohalogen compounds according to the first aspect of the present invention is an apparatus for decomposing organohalogen compounds by irradiating a gas containing the organohalogen compounds with microwave to generate thermal plasma, and reacting the organohalogen compounds with the steam in the thermal plasma, said apparatus including: a neutralization tank containing the alkali solution that reacts with the product gas generated in the decomposing reaction of the organohalogen compounds and steam, thereby generating the neutralization product; a product gas inlet for introducing said product gas into the neutralization tank and causes the product gas to react with the alkali solution; and a neutralization product removing device that removes the neutralization product which settles in the neutralization tank.

In this decomposition apparatus, when the product gas is introduced into the neutralization tank, the gas reacts with the alkali solution to produce the neutralization product. As the neutralization tank is left to stand for a predetermined period of time in this state, the neutralization product precipitates in the alkali solution whereupon the precipitated neutralization product is taken out of the tank thereby achieving solid-liquid separation.

The neutralization product removing device may have such a constitution that includes a takeout tube of which distal end is put into the neutralization tank while extending to near the bottom thereof, and a suction pump that is connected to the takeout tube and pumps up the neutralization product, wherein the takeout tube has a plate disposed at the distal end thereof in parallel to the bottom surface of the neutralization tank while the takeout tube opens in the lower surface of the plate.

In this decomposition apparatus, the neutralization product precipitated in the tank is pumped up through a clearance formed between the bottom surface of the neutralization tank and the plate. With this configuration, the neutralization product is discharged as it precipitates near the bottom of the neutralization tank, so as to avoid such a situation that the alkali solution is pumped up while leaving the neutralization product at the bottom.

The plate may be a disk having an aperture at the center thereof where the takeout tube opens at the bottom thereof. In this case, since the neutralization product is drawn at substantially uniform speed along the entire periphery of the disk-shaped plate, with the speed being retarded, efficiency of recovering the neutralization product is improved.

A second object of the present invention is to break down the bubbles of acidic gas blown into the waste gas processing tank into fine bubbles, thereby increasing the gas-liquid contact area to accelerate the neutralization reaction.

In order to achieve the object, the second aspect of the present invention is an apparatus for decomposing organohalogen compounds by irradiating a gas containing the organohalogen compounds with microwave to generate thermal plasma, decomposing the organohalogen compounds in the thermal plasma, blowing a product gas generated in the decomposing reaction into the alkali solution in the form of bubbles through a blow tube, thereby to neutralize the product gas, said apparatus including: a bubble breakdown device for breaking down the bubbles in order to accelerate the neutralization reaction.

In this apparatus, since the decomposition product gas that is discharged through the end of the blow tube in the form of bubbles is broken into fine bubbles upon collision with the bubble breakdown device, area of contact with the alkali solution increases and the time taken for the bubbles to reach the liquid surface becomes longer, thereby accelerating the neutralization reaction. Thus such a problem is eliminated as excessive amount of acidic gas is released out of the system due to insufficient neutralization.

The bubble breakdown device may include a shaft that is driven to rotate around a center axis thereof, a blade support hub secured on the shaft at an end thereof, and blades planted on the blade support hub around the periphery thereof substantially at right angles to the plane of rotation. This construction makes the constitution of the bubble breakdown device simpler and reduces the cost, while at the same time allows the bubbles to be broken more finely by the rotating blades or a stream generated by the rotation as the bubbles rise through the alkali solution toward the surface. The rotating blades also mix the alkali solution.

A plurality of the blades may be provided radially on the blade support hub, in which case the effects of breaking down the bubbles and mixing the alkali solution are improved further.

The blade support hub may have a disk shape. In this case, the bubbles rising through the alkali solution first hit the disk of the blade support hub that redirects the bubbles in the radial direction along the bottom surface of the blade support hub aid, when the bubbles depart from the blade support hub, the bubbles hit the rotating blades thereby to be broken into fine bubbles about 3 to 5 mm in diameter.

The shaft, the blade support hub and the blades may all be made of stainless steel, with the blades planted on the blade support hub by silver-alloy brazing. This construction ensures the strength of the bubble breakdown device and reduces the possibility of corrosion thereof by the alkali solution.

The waste gas processing tank that contains the alkali solution may also have baffle plates installed on the inner wall thereof to protrude inward. This construction suppresses the variation of the liquid surface and ensures a stable liquid level thereby to stabilize the neutralization reaction, while at the same time restrains the stream generated in the waste gas processing tank and elongates the detention time of the bubbles thereby ensuring reliable neutralization reaction.

A third object of the present invention is to improve the safety in the process of decomposing the organohalogen compounds such as CFC gas.

A decomposition apparatus according to the third aspect of the present invention has a waste gas processing tank containing a processing solution that neutralizes the decomposition product of the organohalogen compounds and a pH sensor that measures the pH value of the processing liquid.

In the organohalogen compound decomposition apparatus, since the pH sensor measures the pH value of the processing liquid, a decrease in the neutralizing power of the processing liquid can be detected.

An alarm devices may also be provided to issue an alarm when the pH value measured by the pH sensor becomes lower than a predetermined level. Thus personnel can be warned when the pH sensor detects a decrease in the pH value of the processing liquid.

A control device may also be provided to stop the process of decomposing the organohalogen compounds when the pH sensor detects a decrease in the pH value of the processing liquid. The control device stops the process of decomposing the organohalogen compounds when the pH sensor detects a decrease in the pH value of the processing liquid. Thus such a problem is eliminated as excessive amount of acidic gas is released out of the system due to insufficient neutralization.

A decomposition apparatus according to another aspect of the present invention includes a waste gas processing tank containing a processing solution that neutralizes the decomposition product of the organohalogen compounds, a bubble breakdown device that breaks down the bubbles of the decomposition product gas in the processing liquid, and a motor installed on the bubble breakdown device, wherein a motor monitor is provided to monitor the rotation of the motor.

In this organohalogen compound decomposition apparatus, since the motor rotation is monitored by the motor monitor, a decrease in the rotation speed or stopping of the motor can be detected.

An alarm device may also be provided to issue an alarm when the motor monitor detects a decrease in the rotation speed of the motor. Thus personnel can be warned when the motor monitor detects a decrease in the rotation speed or stopping of the motor.

A control device may also be provided to stop the process of decomposing the organohalogen compounds when the rotation speed of the motor measured by the motor monitor is lower than a predetermined value. The control device stops the process of decomposing the organohalogen compounds when the motor monitor detects a decrease in the rotation speed or stopping of the motor. Thus such a problem is eliminated as excessive amount of acidic gas is released out of the system due to insufficient neutralization.

A gas leakage sensor may also be provided to detect gas leakage from the reactor tube. This makes it possible to detect corrosion of the reactor tube as the gas leakage sensor monitors gas leakage from the reactor tube.

An alarm device may also be provided to issue an alarm when the gas leakage sensor detects gas leakage. This makes it possible to issue an alarm to alert the personnel when the reactor tube is corroded and gas leakage from the reactor tube is detected by the gas leakage sensor.

A control device may also be provided to stop the process of decomposing the organohalogen compounds when the gas leakage sensor detects gas leakage. In this case, when the reactor tube is corroded and gas leakage from the reactor tube is detected by the gas leakage sensor, the control device stops the process of decomposing the organohalogen compounds. Thus such a problem is eliminated as release of the acidic gas out of the system is continued.

A booth containing the reactor tube may also be installed, so that the gas leakage sensor detects gas within this booth. In this case, since the reactor tube is enclosed in the booth, the gas that has leaked from the reactor tube is not allowed to escape from the system to ensure safety, and gas leakage can be reliably detected by the gas leakage sensor because the leaking gas does not diffuse.

A draft device may be provided to draw the gas from the inside of the booth, with the gas leakage sensor installed midway in the path of drawing the gas by the draft device. This makes it possible to detect gas leakage more reliably since the draft device collects the gas from the booth while gas leakage sensor installed in the path detects the gas.

A fourth object of the invention is to elongate the service life of the reaction apparatus. In order to achieve this object, the fourth aspect of the present invention is an apparatus for decomposing organohalogen compounds by irradiating a gas containing the organohalogen compounds with microwave to generate thermal plasma, decomposing the organohalogen compounds in the thermal plasma, and blowing a product gas generated in the decomposing reaction into the alkali solution through a blow tube extending from the reactor tube downward, thereby to neutralize the product gas, said apparatus including a cooling liquid discharge device mounted on top end of the blow tube to inject a cooling liquid into the tube.

In this constitution, the cooling liquid, that is injected into the blow tube from the top end thereof by the cooling liquid discharge device, flows down the blow tube thereby quickly cooling down the inside of the blow tube within a tolerable temperature range substantially uniformly. Therefore, the blow tube may be made of a resin such as tetrafluoroethylene. The reason for using the blow tube made of a resin is that the blow tube is required to have resistance against corrosion by the acidic solution that is generated from the acidic gas dissolving in water and resistance against corrosion by the alkali solution contained in the waste gas processing tank, which are difficult to satisfy simultaneously by a metallic tube.

Inside of the reaction tube is always dry and is therefore not likely to be corroded, but is required to have heat resistance. Thus the reaction tube may also be made of stainless steel in order to ensure longer service life.

Instead of providing the blow tube with the cooling liquid discharge device, a detachable joint may be installed between the reaction tube and the blow tube while a cooling liquid discharge device is installed in the detachable joint for injecting the cooling liquid to the inside. In this case, although the detachable joint will be gradually corroded since an acidic solution is generated as the product gas of the decomposition is dissolved into the cooling water, the detachable joint may be replaced with a new one as corroded. Since only the detachable joint is required to be replaced when corroded in the downstream portion of the reactor tube, equipment cost can be reduced further and the replacement operation can be simplified.

PREFERRED EMBODIMENT OF THE INVENTION

Now preferred embodiments of the present invention will be described below. It should be understood, however, that the present invention is not limited by the following preferred embodiments but any components and ideas of the embodiments may be freely combined.

[Embodiment 1]

FIG. 1 to FIG. 6 show the first embodiment of the present invention. A rectangular waveguide 1 that extends horizontally in FIG. 3 has a microwave oscillator 2 that generates microwave at a frequency 2.45 GHz mounted on a proximal end (left side end) thereof, and transmits microwave from the proximal end to the distal end (right side end).

Figure 1:
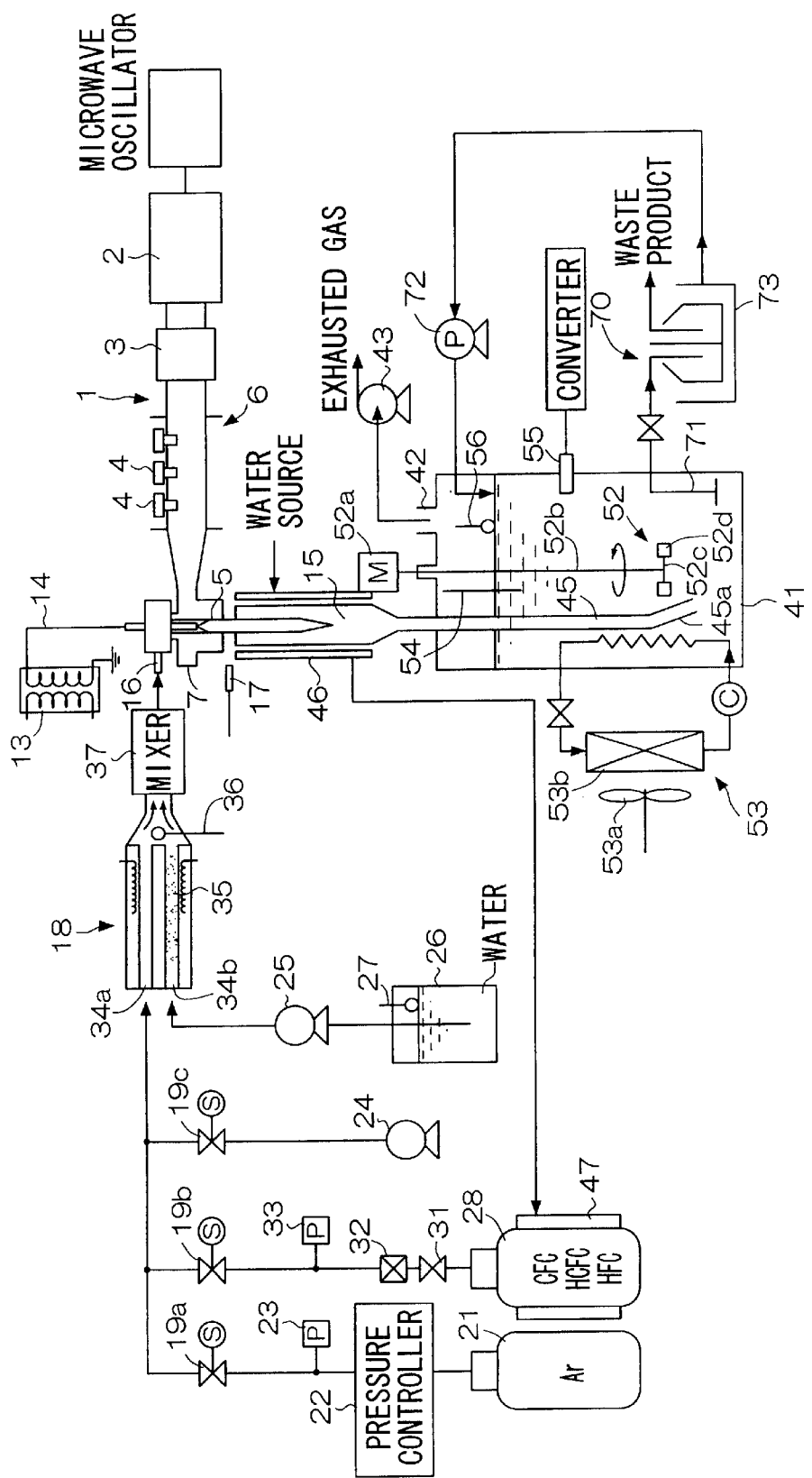
FIG. 1 is a block diagram showing one preferred embodiment of a decomposition apparatus according to the present invention.

The rectangular waveguide 1 has, as shown in FIG. 1, an isolator 3 that absorbs the microwave, that has reflected on the distal end and returned to the proximal end, thereby preventing the reflected wave from affecting the oscillator side, and a tuner 6 that adjusts the amount of mismatch of microwave by adjusting the positions of a plurality of plungers 4 thereby converging the microwave into the discharge tube 5.

Figure 3:
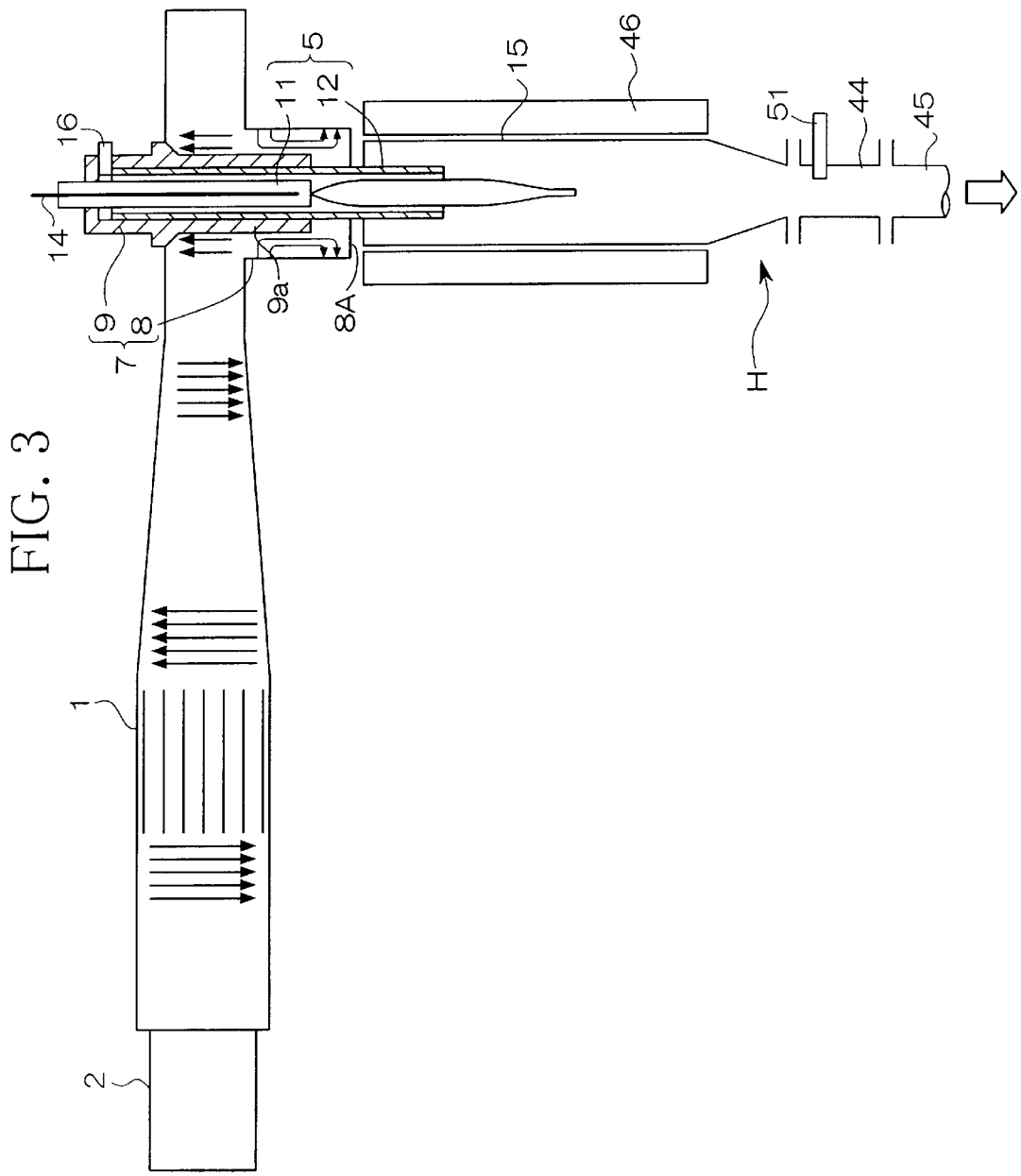
FIG. 3 is a sectional view showing a key portion of the decomposition apparatus.

A circular waveguide 7 includes an outer conductor 8 and an inner conductor 9 that has a diameter smaller than that of the outer conductor 8, as shown in FIG. 3, and is connected to extend vertically while communicating with the rectangular waveguide 1 near the end of the rectangular waveguide 1. The inner conductor 9 is fastened on top of the rectangular waveguide 1 and extends toward an end plate 8a of the outer conductor 8 while surrounding the discharge tube 5 made of quartz, with the extending portion serving as a probe antenna 9a.

The discharge tube 5 consists of an inner tube 11 and an outer tube 12, and is disposed to be concentric with the center axis of the circular waveguide 7. The inner tube 11 of the discharge tube 5 accommodates a Tesla coil 14 that is caused to heat by the igniter 13 inserted therein.

Distal end (lower end) of the inner tube 11 is disposed to protrude inward by a predetermined distance from the distal end of the probe antenna 9a. This distance is set to be equal to, for example, the distance between the distal end of the probe antenna 9a and the focus of energy concentration by the microwave.

Distal end of the outer tube 12 penetrates through the end plate 8a of the outer conductor 8 and communicates with a reactor tube 15 made of copper, while the proximal end (upper end) of the outer tube 12 is secured with a clearance kept from the inner conductor 9.

As shown in FIG. 1, an optical sensor 17 is disposed to face the outer tube 12 exposed between the end plate 8a of the outer conductor 8 and the reactor tube 15. The optical sensor 17 monitors the condition of generating plasma by measuring the luminous intensity.

Inserted into the clearance described above is a gas feeder pipe 16 along the tangential direction of the outer tube 12, so that argon gas, CFC gas (organohalogen compound), air and steam are supplied to the discharge tube 5 through the gas feeder pipe 16. The argon gas, CFC gas and air are sent to a heater 18 selectively from the respective sources by switching electromagnetic valves 19a, 19b, 19c shown in FIG. 1.

Argon gas is supplied to facilitate the ignition prior to the generation of plasma, and is stored in an argon gas cylinder 21. A pressure controller 22 and a pressure switch 23 are installed between the argon gas cylinder 21 and the electromagnetic valve 19a.

The air is supplied from an air compressor 24 for the purpose of improving the stability of ignition by removing moisture from the inside of the system and purging residual gas from the system, and air, nitrogen gas, argon gas or the like is used.

Steam is required to decompose the CFC gas, and is generated by supplying water from a water tank 26 by a plunger pump 25 to the heater 18. The water tank 26 has a level switch 27 installed thereon to monitor the water level.

The CFC gas is stored in a recovered CFC cylinder 28 in the state of liquid, while a throttle 31, a mist separator 23 and a pressure switch 33 are installed between the recovered CFC cylinder 28 and the electromagnetic valve 19b. The throttle 31 is provided to maintain a constant flow, and consists of, for example, a combination of a capillary tube and an orifice. The mist separator 32 is provided for the purpose of removing oil (lubricant) and moisture from the CFC gas, and may be of impinging type or centrifugal type.

The heater 18 is installed not only to generate steam that reacts with the CFC gas, but also to preheat the CFC gas and other material so as to avoid such a problem that the steam is cooled down by the CFC gas in the apparatus and is condensed, and may be an electric heater, steam heater or other type.

Two parallel flow paths 34a, 34b are formed in the heater 18, while CFC gas, argon gas and air are supplied through the path 34a, while water from the water tank 26 is supplied through the path 34b for generating steam.

The path 34b where steam is generated is filled with a resistive material 35 that applies resistance against the flow of steam through the path 34b, so that the steam cannot flow through the passage freely.

The resistive material 35 is made of an inorganic or organic material in the form of particles, fibers or a porous body, or a molding thereof, while it is preferable to use an inorganic material such as oxide including $SiO_2$, $Al_2O_3$, $TiO_2$, MgO or $ZrO_2$, carbide or nitride, in order to prevent degradation that would occur at high temperatures.

Figure 4:
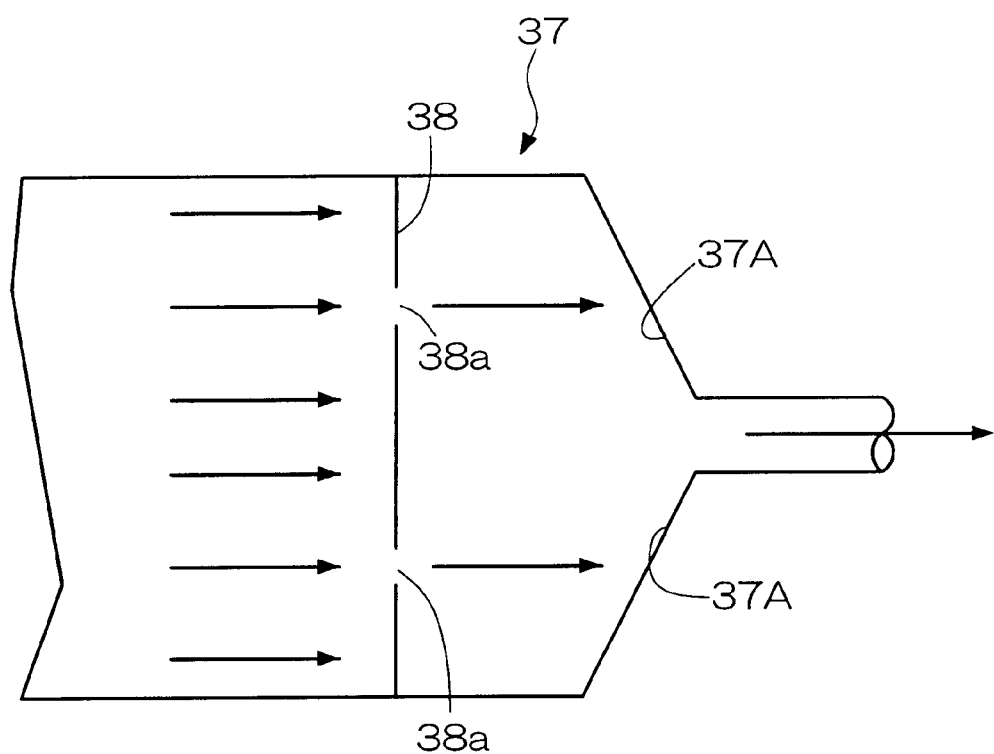
FIG. 4 is a sectional view of a mixer installed in the decomposition apparatus.

A thermocouple 36 is installed near the outlet of the heater 18. The CFC and other gases and steam that have passed the heater 18 are mixed in the mixer 37, and the mixed gas passes through the gas feeder tube 16 and is supplied to the discharge tube 5. The mixer 37 has an orifice 38 installed therein as shown in FIG. 4 having an aperture 38a that is 0.1 to 5 mm in diameter. An outlet side end face 37A of the mixer 37 to which the aperture 38a faces is tapered so that the sectional area of the passage gradually reduces.

An waste gas processing tank (neutralization tank) 41 is provided in order to neutralize the acidic gas (hydrogen fluoride and hydrogen chloride) that are generated when the CFC gas is decomposed, to make the gas harmless, and contains alkali suspension (alkali solution) made by adding 10% of calcium hydroxide to water.

Although the alkali suspension is used in this embodiment, an alkali solution may also be used instead. However, use of the alkali suspension is preferred in order to have the neutralization reaction proceed quickly.

When flon R12 recovered from a discarded refrigerator is decomposed, for example, the product gases generated in the decomposing reaction represented by the scheme (1) are neutralized in the reaction represented by the scheme (2).

Scheme 1

Scheme 2

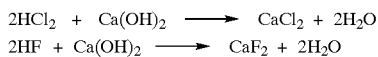

Since the neutralization product (calcium chloride and calcium fluoride) generated in the neutralization reaction represented by the scheme (2) have low solubility, part thereof are dissolved into the alkali solution but mostly precipitated as slurry.

Carbon dioxide generated through the decomposition reaction of the scheme (1) and the acidic gas that has been decreased in concentration to a very low level below a permissible exhaust level by the neutralization reaction represented by the scheme (2) are released to the outside of the system by a blower 43 through an exhaust duct 42 connected to the top of the waste gas processing tank 41.

Installed in the waste gas processing tank 41 is a blow tube (product gas introducing portion) 45, that is connected to the reactor tube 15 via the detachable joint 44, to extend vertically with the bottom end thereof being immersed in the alkali solution. A distal end 45a of the blow tube 45 is formed to incline by a predetermined angle from the vertical direction.

Installed at a middle portion in the axial direction of the reactor tube 15 to surround the circumference thereof is a cooling jacket 46 having a cooling water pipe (not shown). The cooling jacket 46 is for the purpose of cooling the product gas of the decomposition reaction of the scheme (1), and is controlled so as not to lower the temperature below the dew point of the steam in order to prevent the residual steam in the reactor tube 15 from being condensed again. In this embodiment, the gas is cooled down to about 400° C.

The cooling water of the cooling jacket 46 that has been warmed while cooling the reactor tube 15 is used as the heat source for the recovered CFC cylinder 28. Specifically, a heating jacket 47 having a warm water pipe (not shown) is disposed around the recovered CFC cylinder 28, while the cooling water used to cool down the reactor tube 15 is passed through the warm water pipe thereby heating the recovered CFC cylinder 28.

The detachable joint 44 is connected detachably between the reactor tube 15 and the blow tube 45, and a water nozzle 51 is installed to communicate with the inside of the detachable joint. Cooling water is discharged from the water nozzle 51 so as to quickly cool down the blow tube 45 that is made of a resin, for example coated with fluorocarbon, within a tolerable temperature range thereof. In case the blow tube 45 is coated with fluorocarbon, it is desirable to cool down to 100° C. or lower.

The reason for using the blow tube 45 made of a resin is that the blow tube 45 is required to have resistance against corrosion by the acidic solution generated from the acidic gas dissolving in the cooling water and resistance against corrosion by alkali solution contained in the waste gas processing tank 41, which are difficult to satisfy simultaneously by a metallic tube.

On the other hand, the inside of the reactor tube 15 is always dry and is therefore not likely to be corroded, but is required to have heat resistance. Thus the reaction tube is made of copper for longer service life.

The product gas of the decomposition reaction of the scheme (1) is released from the distal end (lower end) of the blow tube 45 in the form of bubbles into the alkali solution. Since the reaction of neutralization by the alkali solution proceeds more quickly when the area of contact between the bubbles and the alkali solution is greater and the time taken by the bubbles to reach the liquid surface is longer, a bubble breakdown device 52 that breaks down the bubbles into fine bubbles is installed in the waste gas processing tank 41 for the purpose of accelerating the neutralization reaction of the scheme (2).

The bubble breakdown device 52 includes a shaft 52b that is driven to rotate by a motor 52a, a disk-shaped blade support hub 52c secured on the shaft 52b at an end thereof, and six blades 52d planted on the blade support hub 52c around the periphery thereof. The shaft 52b, the blade support hub 52c and the blades 52d are all made of stainless steel, with the blades 52d being planted on the blade support hub 52c by silver-alloy brazing at equal intervals along the circumference. The reason for employing the silver-alloy brazing for fastening the blades is that ordinary welding is not durable against corrosion by alkali solution.

The bubble breakdown device 52 is disposed so that the center of the blade support hub 52c is located above the distal end of the reactor tube 15. The bubbles rising from the distal end of the reactor tube 15 hit the blades 52d that rotate at a speed of 300 rpm and are broken into fine bubbles about 3 to 5 mm in diameter. The bubble breakdown device 52 also forms suspension of water and calcium hydroxide that is insoluble to water, by mixing the calcium hydroxide powder charged into the waste gas processing tank 41.

The waste gas processing tank 41 has a cooler 53 installed therein for lowering the temperature below the tolerable temperature of the blow tube 45, since the neutralization reaction of the scheme (2) is an exothermic reaction. The cooler 53 has such a construction as a part of a pipe connected to a radiator 53b, which is cooled down by a fan 53a, is disposed to pass through the inside of the waste gas processing tank 41 so that heat is deprived from the inside of the tank and carried by a cooling medium such as water that flows through the pipe, and is dissipated from the radiator 53b. Temperature in the tank is monitored with a thermocouple 54.

A pH sensor 55 is installed in the waste gas processing tank 41. The pH value of the alkali solution is constantly monitored by a controller 61 (refer to FIG. 2) using the pH sensor 55. When the pH value drops to 9 (the value is initially 11 to 12 at the start of operation), for example, the controller 61 causes an alarm device to work and stops the decomposition process. The alarm device may be of any type as long as personnel nearby can be alerted; such as a flashing lamp or a sound.

The waste gas processing tank 41 has a neutralization product removing device (neutralization product removing means) 70 installed therein for removing the neutralization product precipitated at the bottom of the tank and returning the alkali solution contained in the neutralization product into the waste gas processing tank 41.

Figure 5:
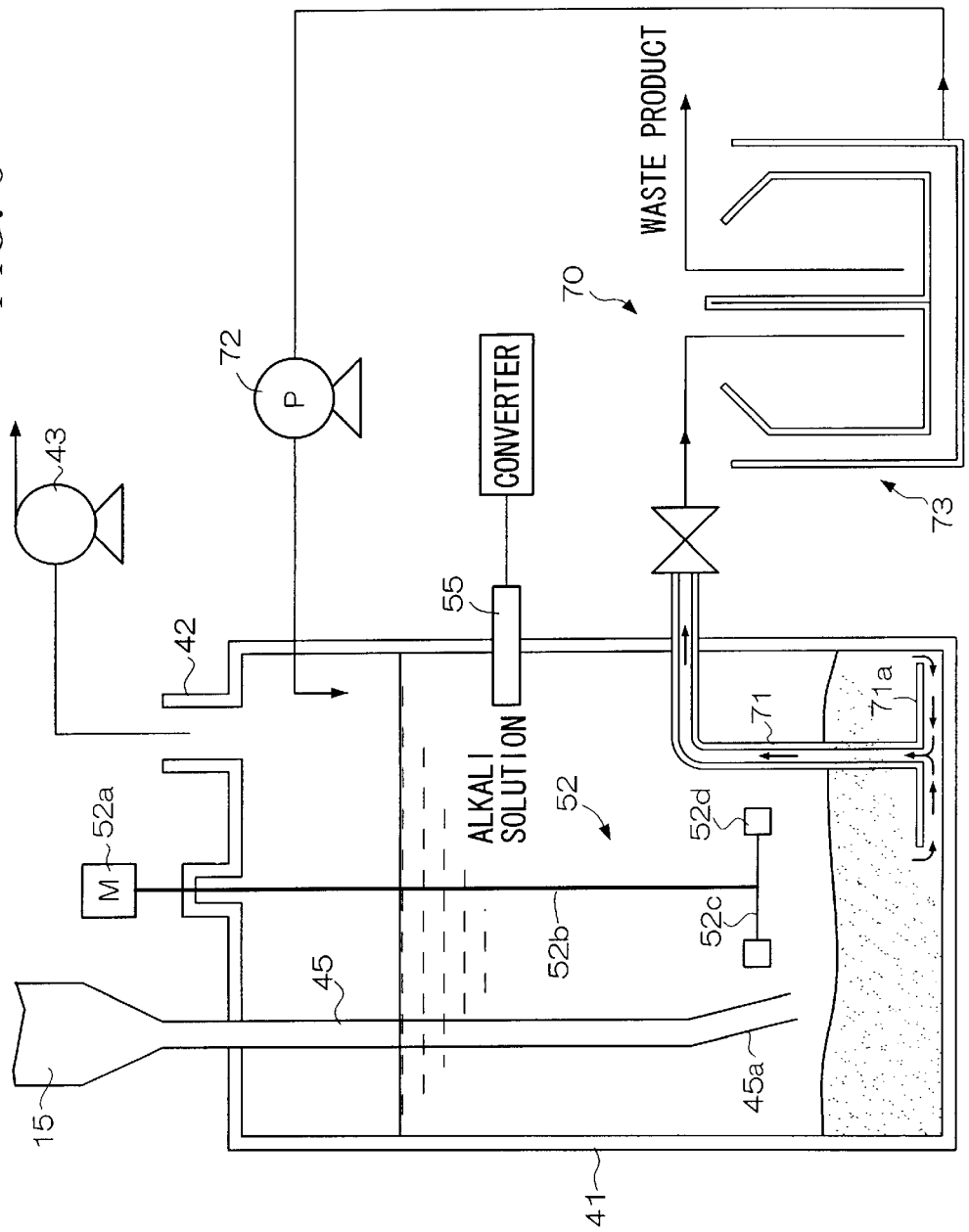
FIG. 5 is a sectional view of a neutralization product removing device installed in the decomposition apparatus.

The neutralization product removing device 70 includes a takeout tube 71 that is put into the waste gas processing tank 41 for pumping up the neutralization product, a suction pump 72 that is connected to the takeout tube 71 for pumping up the neutralization product and a solid-liquid separator 73 that separates solution from the neutralization product that has been taken out of the waste gas processing tank 41, as shown in FIG. 5.

Distal end of the takeout tube 71 extends to near the bottom of the waste gas processing tank 41. The takeout tube 71 has a disk-shaped plate 71*a* fastened at the distal end thereof in parallel to the bottom surface of the waste gas processing tank 41 while the takeout tube 71 opens in the lower surface of the plate 71*a* at the center thereof.

A piping communicating with the takeout tube 71 is connected to the suction pump 72 via the solid-liquid separator 73, and runs further from the suction pump 72 to the top of the waste gas processing tank 41, thereby forming a circulating system. The solid-liquid separator 73 may be of centrifugal type, pressure dewatering type, vacuum dewatering type, or other type. Variation of the liquid level in the waste gas processing tank 41 is checked by means of a level switch 56.

Figure 6:
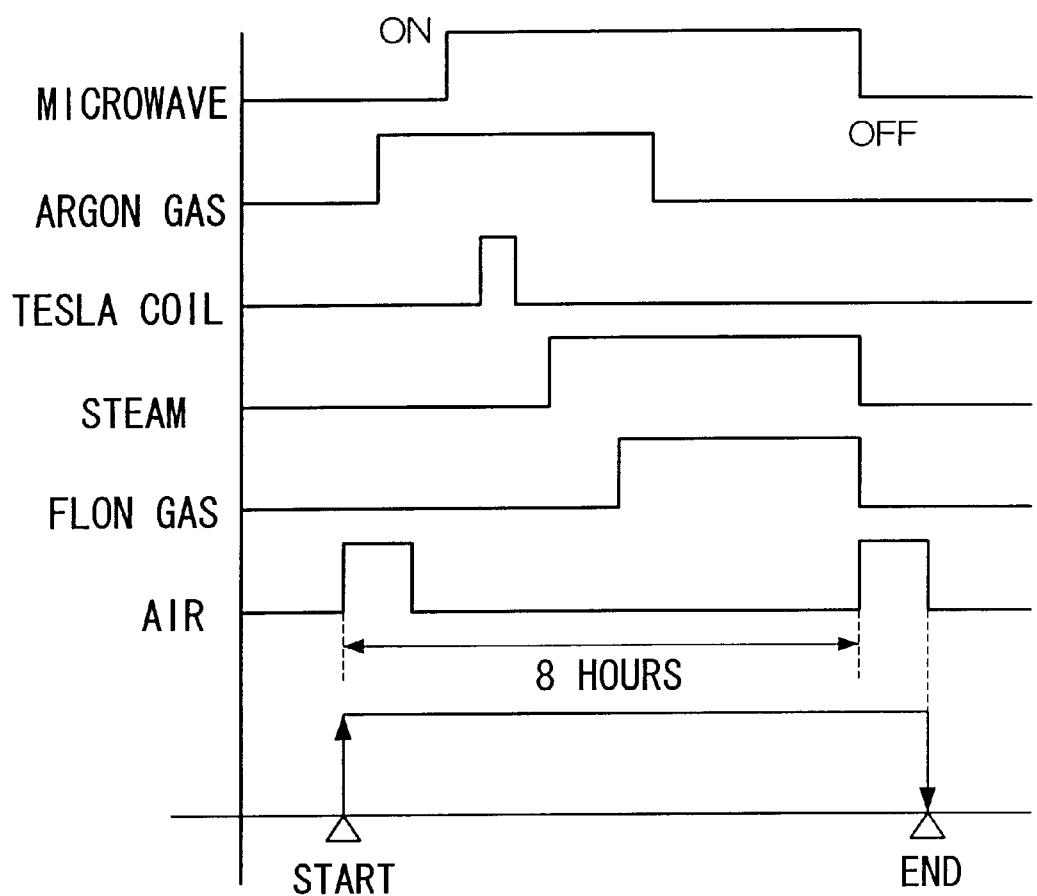
FIG. 6 is a timing chart showing the timing of supplying microwave, argon gas, etc. and the timing of ignition in the decomposition apparatus.

In the organohalogen compound decomposition apparatus having such a constitution as described above, operation of the electromagnetic switches and ignition of the Tesla coil 14 are controlled as shown in FIG. 6 by the controller 61. As will be apparent from this drawing, CFC gas is decomposed in this decomposition apparatus in batch process with one cycle of operation lasting for eight hours.

The operation proceeds as follows. Before CFC gas and steam are supplied, air is supplied for a predetermined period (3 minutes) in order to purge residual moisture. After stopping the supply of air, argon gas is supplied for the purpose of stabilizing the ignition. While the argon gas is being supplied, microwave is generated to ignite by means of the Tesla coil while the steam and CFC gas are supplied. Then the supply of argon gas is stopped.

When the operation of the decomposition process is stopped, air is supplied for a predetermined period (5 minutes) to purge the residual acidic gas in order to ensure safety. The purging air is supplied from a nozzle (not shown) located above the reactor tube 15 as shown in FIG. 3.

In the process described above, while there is a period when the supply of argon gas and the supply of CFC gas are carried out at the same time, this period after starting the supply of CFC gas before stopping the supply of argon gas may be a very short period of time. This is because it becomes unnecessary to supply argon gas once the ignition has stabilized, and consumption of argon gas should be minimized in order to lower the running cost.

The controller 61 receives signals from various sensors such as the pressure sensors 23, 33, the thermocouples 36, 54, the level switches 27, 56 and the optical sensor 17, thereby constantly monitoring the pressures of the argon gas and CFC gas supplied to the heater 18, liquid level in the water tank 26, condition of the plasma, temperature and liquid level in the waste gas processing tank 41. When any of these signals deviates from a permissible range, there is a possibility that the operation is not going on normally, and therefore the operation is stopped. When the operation is stopped, air is supplied to purge the residual gas from the inside of the system for safety, as described above.

Now the operation of the decomposition apparatus according to this embodiment will be described below. In this decomposition apparatus, first the electromagnetic valves 19*a*, 19*b* are closed and, at the same time, the electromagnetic valve 19*c* is opened to supply air from the air compressor 24 through the gas feder pipe 16 to the discharge tube 5 for three minutes. Since the air is heated to 100 to 180° C. when passing the heater 18, residual moisture in the apparatus is sufficiently removed.

Then with the electromagnetic valve 19*c* being closed and the electromagnetic valve 19*a* opened, argon gas is supplied to the discharge tube 5. Since the argon gas is supplied in the tangential direction of the outer tube 12 and flows down spirally, a stagnant portion is formed near the end of the inner tube 11 that makes it easier to maintain the plasma.

Flow rate of supplying the gas is set in a range from 4 to 40 liters/min., preferably 15 liters/min. or more. When the gas is supplied at this rate, the stagnant portion is effectively formed so that it is made more easier to maintain the plasma, with the discharge tube 5 becoming less susceptible to the influence of heat from the plasma, thereby effectively preventing the discharge tube 5 from being melting, deforming or being damaged.

Upon lapse of a predetermined period of time after starting the supply of argon gas, the microwave oscillator 2 generates microwave. The microwave is transmitted through the rectangular waveguide 1 to the distal end thereof, and further into the circular waveguide 7. The microwave is transmitted in the circular waveguide 7 in TM01 mode that has high electric field intensity. Moreover, because the inner conductor 9 couples the electric field mode in the rectangular waveguide 1 and the electric field mode in the circular waveguide 7, the electric field in the circular waveguide 7 is stabilized.

This operation will be described in more detail below. The microwave oscillator 2 drives a magnetron, mounted at one end of the rectangular waveguide 1 that has rectangular cross section, to generate electromagnetic wave of a predetermined frequency. While the propagation of the electromagnetic wave can be determined by solving the Maxwell's electromagnetic wave equation, the microwave in this case propagates in TE mode where there is no electric field component in the direction of propagation. An example of the first order component TE10 of this electromagnetic wave is shown in by arrows of alternating directions in FIG. 3 in longitudinal section of the propagating direction. In a ring-shaped cavity of the circular waveguide 7 formed at the other end of the rectangular waveguide 1, electromagnetic wave of TE mode having electric field component in the direction of propagation is generated due to coupling by the inner conductor 9 of the electromagnetic wave propagating in the rectangular waveguide 1 and the electromagnetic wave reflected on the end of the waveguide. The first order component TE10 of this electromagnetic wave in the ring-shaped cavity is similarly shown by arrows in FIG. 3. Fine adjustment related to the secondary and higher harmonics of the electromagnetic wave is done by means of the tuner 6. The isolator 3 protects the microwave oscillator 2 from serious damage.

Then the igniter 13 causes the Tesla coil 14 to heat and ignite. The ignition is easily done since moisture in the discharge tube 5 has been purged by the air and argon gas that helps ignition has been supplied.

Water is pumped up from the water tank 26 by the plunger pump 25 and steam generated from the water by the heater 18 is supplied to the discharge tube 5. Since the steam does not flow freely through the path due to the resistive material 35 that fills the inside of the heater 18, there exists always a constant amount of steam staying in the heater 18. This prevents pulsation and scattering due to sudden boiling thereby stabilizing the flow rate of steam, and effectively suppressing the variation in the flow rate in the upstream of the mixer 37. As a result, plasma can be stabilized without causing the loss of plasma, and the processing capability can be increased.

Then the electromagnetic valve 19*b* is opened to supply CFC gas to the discharge tube 5. The CFC gas flowing out of the recovered CFC cylinder 28 is free from oil and moisture which have been removed in the mist separator 32. This prevents the lubricant included in the CFC gas from contaminating the piping and other components and prevents byproducts from being produced. Consequently, efficient and stable supply of CFC gas is made possible, and excessive supply of water that would cause the loss of plasma can be prevented. Thus the plasma can be stabilized and the processing capacity can be increased.

Mixing of the steam, argon gas and CFC gas that have passed the heater 18 and entered the mixer 37 is accelerated not only by the pressure loss that is caused when passing the aperture 38a of the orifice 38 but also by hitting the end face 37A on the outlet side, and therefore mixture of the gases that are uniformly mixed exits from the mixer 37 and enters the discharge tube 5. As a result, the decomposing reaction of the scheme (1) proceeds satisfactorily, while minimizing the generation of byproducts such as chlorine gas and carbon monoxide.

When the CFC gas that has been supplied to the discharge tube 5 is irradiated with microwave, thermal plasma having high electron energy and a temperature raised as high as 2000 to 6000 K is generated in the discharge tube 5. Since argon gas is supplied as well as the CFC gas and steam to the discharge tube 5, loss of plasma will not be caused.

Also because the end of the inner tube 11 is located to protrude by a predetermined distance from the distal end of the probe antenna 9a, the inner tube 11 can be prevented from being melted or damaged by the heat of the plasma thus generated. Thus stable decomposition process can be maintained by preventing significant change in the shape of plasma.

Thus as the CFC gas is made easier to dissociate into chlorine atoms, fluorine atoms and hydrogen atoms by the thermal plasma, the CFC gas reacts with steam and dissociates according to the scheme (1). When the plasma has stabilized, the electromagnetic valve 19a is closed to stop the supply of argon gas.

Product gas of the decomposition reaction passes the detachable joint 44 and the blow tube 45 to be blown into the alkali solution contained in the waste gas processing tank 41. Since the product gas is at a very high temperature, however, it is cooled down to about 400° C. by the cooling jacket 46 installed on the reactor tube 15 before entering the blow tube 45. Since the residual steam (concentration of about, for example, 6%) in the reaction tube 15 does not condense at this temperature, the reactor tube 15 is kept dry and loss of plasma will not be caused.

The cooling water of the cooling jacket 46 that has been warmed to about 50° C. by cooling the reactor tube 15 is sent to the heater 47 installed on the recovered CFC cylinder 28, so as to prevent frosting on the cylinder 28 and the piping located downstream thereof due to evaporation of liquid CFC in the recovered CFC cylinder 28, as well as pressure from fluctuating due to temperature drop. The cooling water that has lost the heat can be used again as the cooling water of the cooling jacket 46, thereby reducing the water consumption.

The product gas that has been cooled by the cooling jacket 46 is cooled down quickly to about 100° C. or lower by the cooling water discharged from the water nozzle 51 while passing through the joint detachable 44. This allows it to use the resin blow tube 45 within the tolerable temperature range thereof, while protecting the tube from thermal damage at high temperatures. Flow rate of cooling water discharged from the water nozzle 51 is in a range from 50 to 1000 cm³/min.

Although the detachable joint 44 will be gradually corroded since an acidic solution is generated as the product gas of the decomposition reaction as shown by the scheme (1) is dissolved into the cooling water, the detachable joint 44 may be replaced with a new one as corroded.

Since only the detachable joint 44 is required to be replaced when corroded in the downstream portion of the reactor tube 15, equipment cost can be reduced further and the replacement operation can be simplified.

The product gas blown into the alkali solution from the blow tube 45 is neutralized to be harmless in the neutralization reaction of the scheme (2), and is released through the exhaust duct 42. Since the neutralization reaction is an exothermic reaction, the alkali solution is maintained at a temperature not higher than 70° C. by the cooler 53 in order to protect the blow tube 45 from thermal damage.

The product gas discharged in the form of bubbles from the end of the blow tube 45 is broken into fine bubbles upon hitting the blades 52d of the bubble breakdown device 52. Thus the area of contact with the alkali solution increases and the time taken for the bubbles to reach the liquid surface becomes longer, thereby accelerating the neutralization reaction. Thus such a problem is eliminated as excessive amount of acidic gas is released out of the system due to insufficient neutralization.

The neutralization product generated in the neutralization reaction precipitates as slurry in the alkali solution. Accordingly, when the decomposition process is stopped after one day's operation, the decomposition apparatus is left to stand still over night, during which the slurry settles down in the alkali solution in the waste gas processing tank 41.

When the neutralization product removing device 70 is started before starting the operation of the decomposition apparatus on the next day, the neutralization product in the form of slurry that has settled in the waste gas processing tank 41 is pumped up, beginning with that settled near the bottom, through the clearance formed between the bottom of the tank and the plate 71a. As a consequence, such a phenomenon is not likely to occur that a hole is made in the settled body of the neutralization product and the alkali solution in the upper layer is pumped up through the hole while leaving the precipitated neutralization product in the tank. Moreover, since the neutralization product is drawn at substantially uniform speed along the entire periphery of the disk-shaped plate 71a, with the speed being retarded, the neutralization product can be removed more reliable.

The neutralization product that is taken out of the waste gas processing tank 41 is processed in the solid-liquid separator 73. The neutralization product that has been dewatered to contain almost no residual alkali solution is disposed of as waste, or used for some purpose. The alkali solution that has been extracted is sent by the suction pump 72 to the waste gas processing tank 41 to be reused. Therefore, water consumption in this decomposition apparatus is greatly reduced due in part to the reuse of the cooling water. When the operation of the decomposition process is stopped, the air compressor is operated to purge the residual acidic gas in order to ensure safety.

[Embodiment 2]

Figure 7:
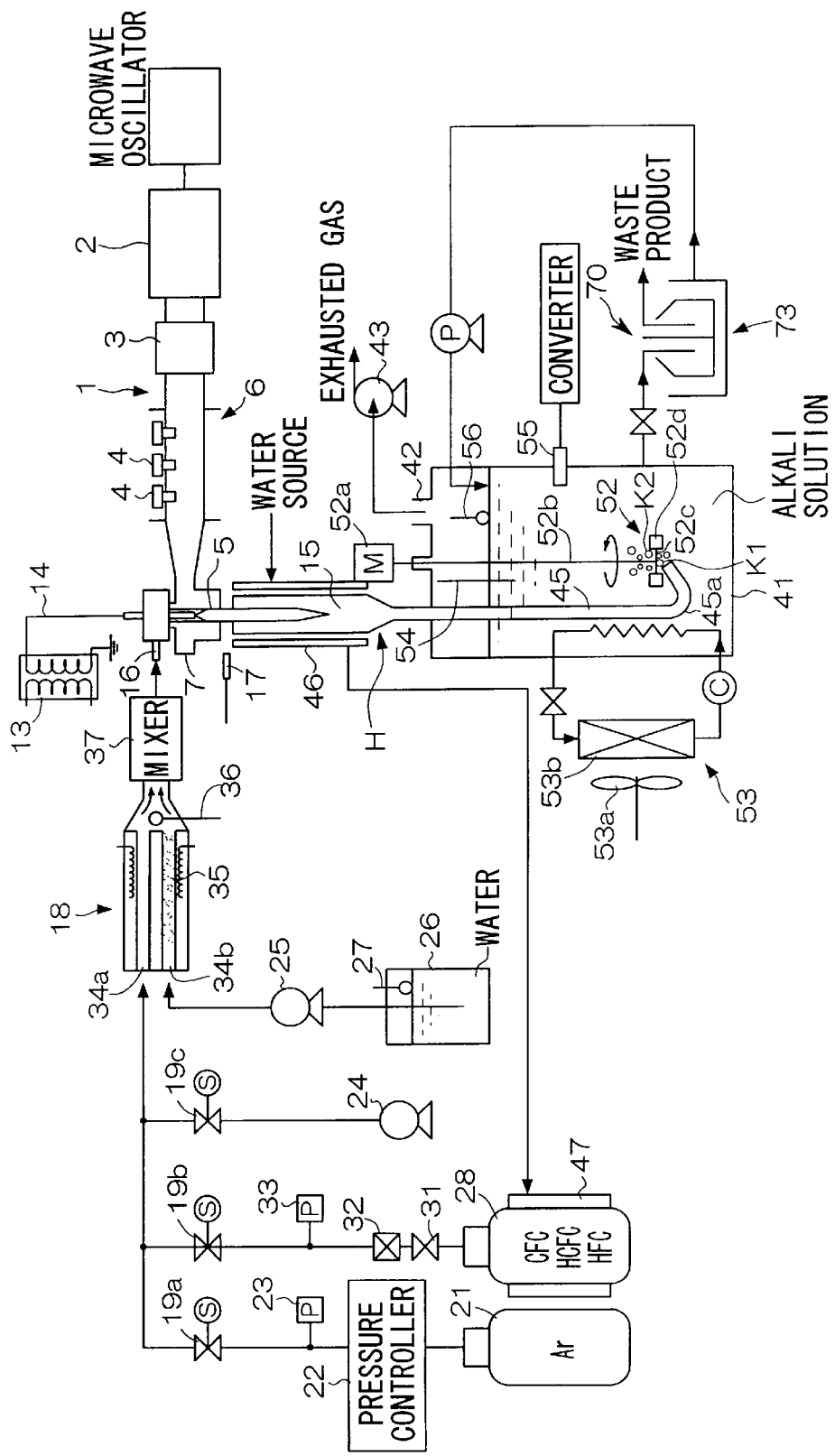
FIG. 7 is a block diagram showing another embodiment of the decomposition apparatus according to the present invention.
Figure 8:
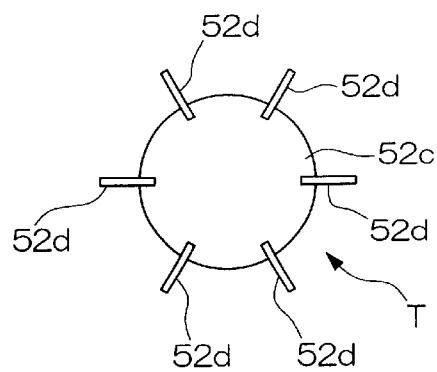
FIG. 8 is a plan view of blade and blade support hub.
Figure 9:
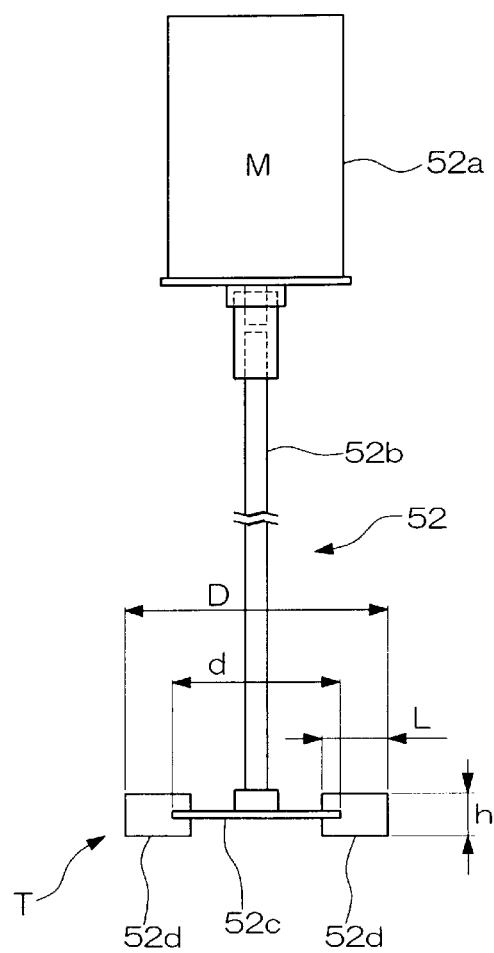
FIG. 9 is a side view of a bubble breakdown device.

FIG. 7 is a block diagram showing the second embodiment of the decomposition apparatus according to the present invention. Components identical with those of the first embodiment will be identified by the same reference numerals and description thereof will be omitted. FIG. 9 is an enlarged view of the bubble breakdown device shown in FIG. 7. FIG. 8 is an enlarged plan view of the blades and the blade support hub.

In this embodiment, an U-shaped pipe 45a (elbow) made of, for example, Teflon (registered trade mark) is connected to the distal end (lower end) of the blow tube 45 that extends vertically, while the product gas generated in the decomposition reaction of the scheme (1) is blown into the alkali solution in the form of bubbles from the end of the U-shaped pipe 45a which is directed obliquely upward.

Since the neutralization reaction in the alkali solution is accelerated when the area of contact with the alkali solution increases and the time taken for the bubbles to reach the liquid surface becomes longer, the bubble breakdown device 52 is installed in the waste gas processing tank 41 for accelerating the neutralization reaction of the scheme (2) by breaking the bubbles into fine bubbles.

As shown in FIG. 7 to FIG. 9, the bubble breakdown device 52 includes a shaft 52b that is driven by a motor 52a to rotate around an center axis thereof, a blade support hub 52c of a disk shape secured on the shaft 52b at an end thereof, and a plurality (six in this example) of blades 52d fastened on the blade support hub 52c around the periphery thereof at equal intervals. The blades 52d are disposed at substantially right angles to the plane of rotation (horizontal plane). The number of the blades 52d is not limited to six, and may be other number of plurality or one.

The shaft 52b, the blade support hub 52c and the blades 52d are all made of stainless steel, with the blades 52d being planted on the blade support hub 52c by silver-alloy brazing at equal intervals along the circumference, thus constituting a turbine type rotor T.

The reason for employing the silver-alloy brazing for fastening the blades is that ordinary welding is not durable against corrosion by alkali solution. The blade support hub 52c and the blades 52d may also be formed integrally from a corrosion resistant resin such as tetrafluoroethylene and screwed onto the shaft 52b, thereby eliminating welds and the possibility of corrosion. In this embodiment, while the outer diameter D of the turbine type rotor T, the outer diameter d of the blade support hub 52c and the length L and height h of the blade 52d are set to about 180 mm, about 120 mm, about 45 mm and about 30 mm, respectively, as shown in FIG. 8 and FIG. 9, but the dimensions are not limited to these values.

The bubble breakdown device 52 is disposed so that the center of the blade support hub 52c is located above the distal end of the U-shaped pipe 45a of the blow tube 45. The bubbles (refer to K1 in FIG. 7) rising from the distal end of the U-shaped pipe 45a first hit the blade support hub 52c (disk) and move radially along the bottom surface of the blade support hub 52c. Then upon departing from the blade support hub 52c and hitting the rotating blades 52d, the bubbles are broken into fine bubbles (refer to K2 in FIG. 7) measuring 3 to 5 mm in diameter.

The bubble breakdown device 52 also forms suspension of water and calcium hydroxide that is insoluble to water, by mixing the calcium hydroxide powder charged into the waste gas processing tank 41.

Figure 2:
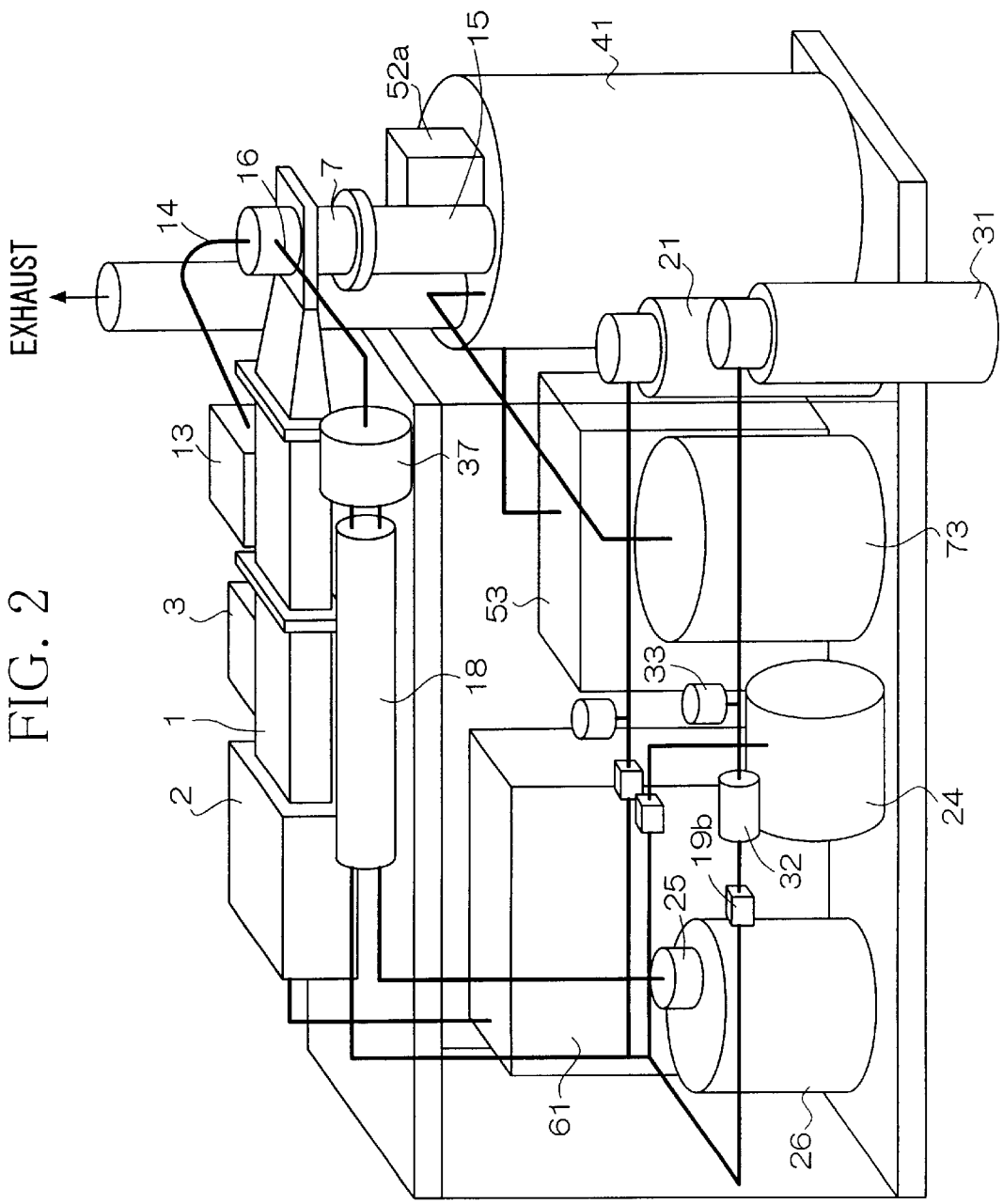
FIG. 2 is a perspective view showing the decomposition apparatus.
Figure 10:
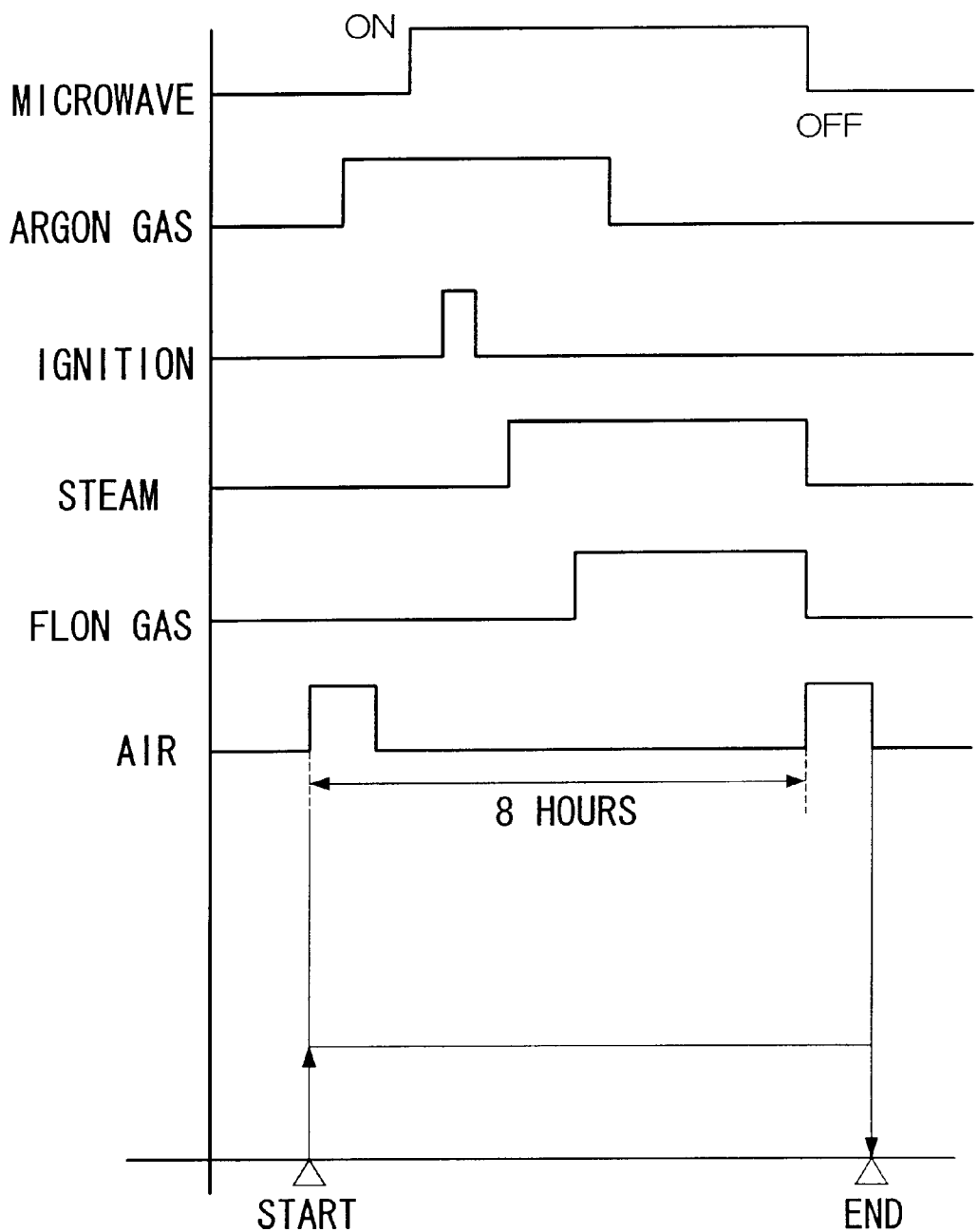
FIG. 10 is a timing chart showing the timing of supplying microwave, argon gas, etc. and the timing of ignition in the decomposition apparatus.

In the organohalogen compound decomposition apparatus having such a constitution as described above, operation of the electromagnetic switches and ignition of the igniter 13 are controlled as shown in FIG. 10 by the controller 61 (refer to FIG. 2).

While rotating the blades 52d by the bubble breakdown device 52, air is supplied for a predetermined period (3 minutes) in order to purge residual moisture. After stopping the supply of air, argon gas is supplied for the purpose of ignition. While the argon gas is being supplied, microwave is generated to ignite by means of the igniter 13 and, at the same time, steam and CFC gas are supplied. Then the supply of argon gas is stopped.

When the operation of the decomposition process is stopped, air is supplied for a predetermined period (5 minutes) to purge the residual acidic gas in order to ensure safety. The purging air is supplied from a nozzle (not shown) located above the reactor tube 15.

In the process described above, while there is a period when the supply of argon gas and the supply of CFC gas are carried out at the same time, this period after starting the supply of CFC gas before stopping the supply of argon gas may be a very short period of time. This is because it becomes unnecessary to supply argon gas once the ignition has stabilized, and consumption of argon gas should be minimized in order to lower the running cost.

The controller 61 receives signals from various sensors such as the pressure switches 23, 33, the thermocouples 36, 54, the level switches 27, 56 and the optical sensor 17, thereby constantly monitoring the pressures of the argon gas and CFC gas supplied to the heater 18, liquid level in the water tank 26, condition of the plasma, temperature and liquid level in the waste gas processing tank 41. When any of these signals deviates from a permissible range, there is a possibility that the operation is not going on normally, and therefore the operation is stopped.

The product gas discharged in the form of bubbles K1 from the end of the U-shaped pipe 45a of the blow tube 45 is broken into fine bubbles upon hitting the blades 52d of the bubble breakdown device 52. As a result, the area of contact with the alkali solution increases and the time taken for the bubbles to reach the liquid surface becomes longer, thereby accelerating the neutralization reaction. Thus such a problem is eliminated as excessive amount of acidic gas is released from the system to the outside due to insufficient neutralization. While the fine bubbles K2 generated by breakdown are 3 to 5 mm in diameter in this embodiment, diameters of bubbles after breakdown by using the screw of the prior art have greater variations in a range from 3 to 10 mm.

The waste gas processing tank may also have one or a plurality of baffle plates installed on the inner wall thereof extending at right angles to the inner wall, in order to stabilize the neutralization reaction further. This construction suppresses the variation of the liquid surface and ensures a stable liquid level thereby to stabilize the neutralization reaction, while at the same time restrains the stream generated in the waste gas processing tank and elongates the detention time of the bubbles thereby ensuring reliable neutralization reaction.

[Embodiment 3]

Now the third embodiment of the present invention will be described below with reference to FIG. 11 and FIG. 12. Components identical with those of the first embodiment will be identified by the same reference numerals and description thereof will be omitted.

Figure 11:
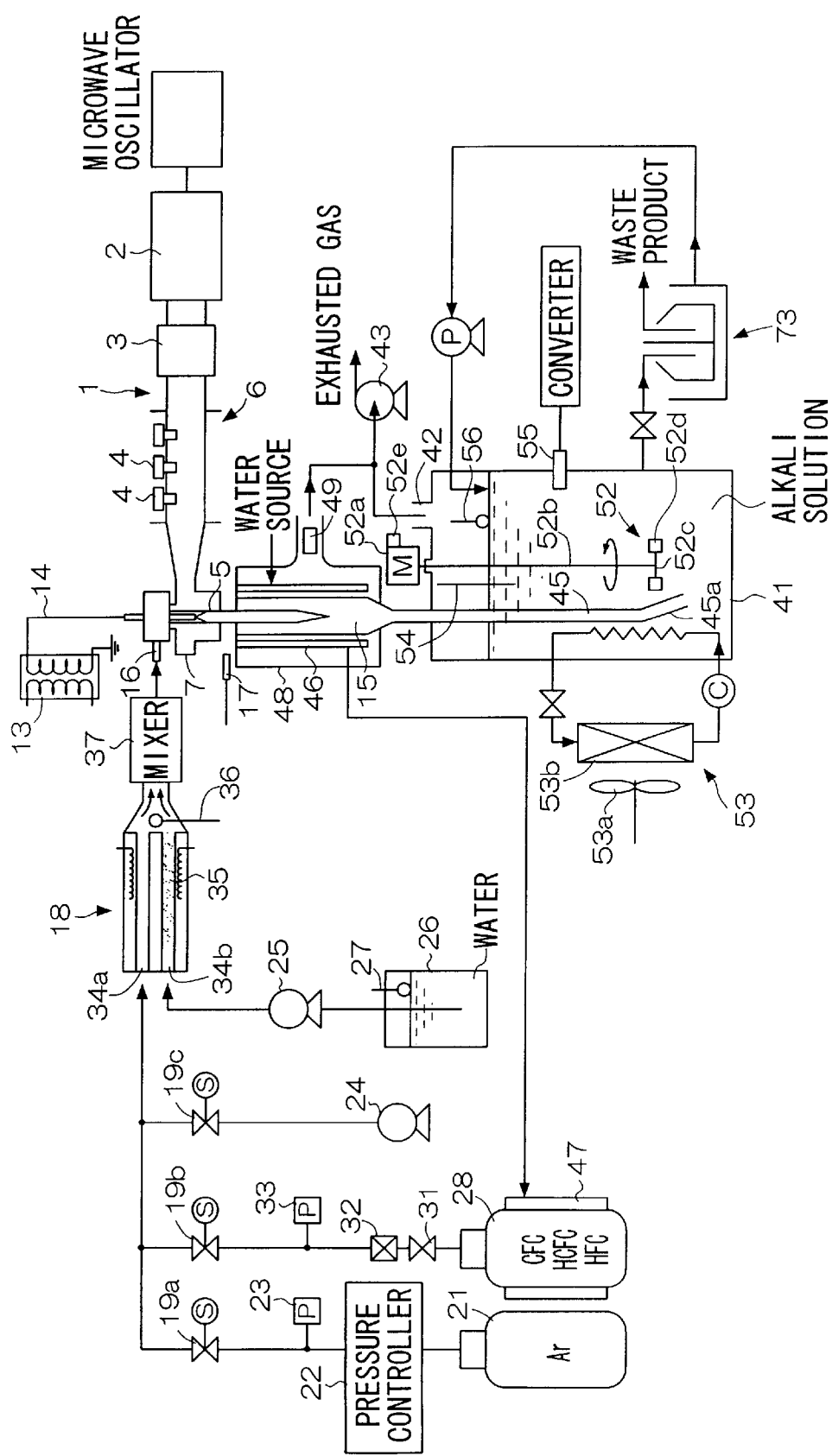
FIG. 11 is a block diagram showing another embodiment of the decomposition apparatus according to the present invention.
Figure 12:
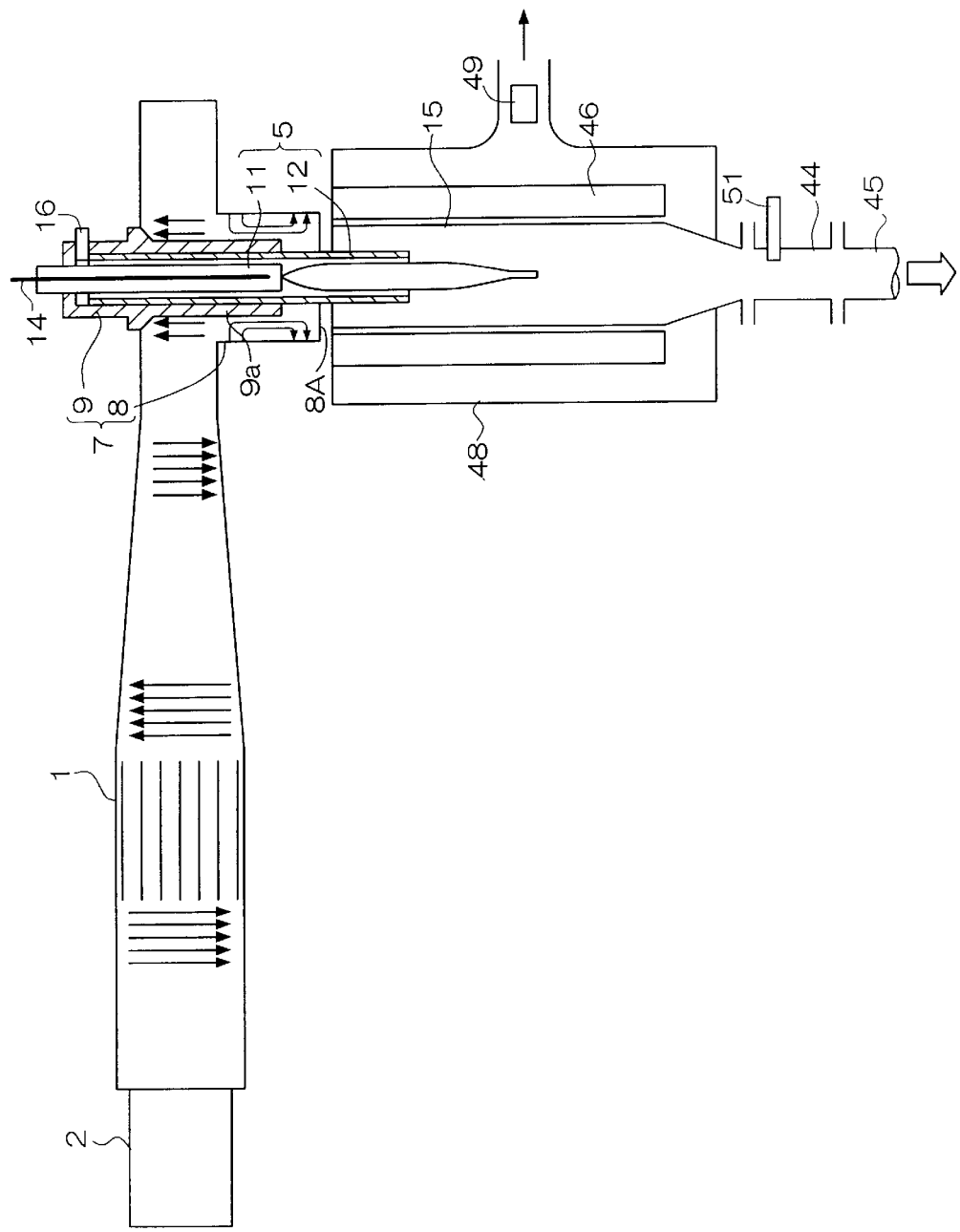
FIG. 12 is a sectional view showing a key portion of the decomposition apparatus.

In this embodiment, in order to improve the safety further, a simplified booth 48 that encloses the reactor tube 15 is installed as shown in FIG. 11 and FIG. 12. Atmosphere in the simplified booth 48 is drafted to the outside by using a blower (suction device) 43 installed in the exhaust duct 42. Installed in the path located outside of the simplified booth 48 for drafting gas running from the simplified booth 48 to the blower 43 is a gas leakage sensor 49 that detects $CO_2$ gas, CO gas and others that would leak from the reactor tube 15.

Corrosion of the reactor tube 15 is constantly monitored by the controller (control device) 61 by means of the gas leakage sensor 49. Should the reactor tube 15 be corroded and the gas generated in the decomposition reaction of the scheme (1) leaks out of the reactor tube 15, the simplified booth 48 prevents the acidic gas from escaping to the outside of the system. Also the controller 61 causes alarm device to work and stops the decomposition process. The alarm device may be of any type as long as personnel nearby can be alerted, such as a flashing lamp or sounding.

Location of installing the gas leakage sensor 49 is not limited to the inside of the simplified booth 48 as long as the gas in the simplified booth 48 can be monitored and the gas leaking from the reactor tube 15 can be detected, and the gas leakage sensor 49 may also be installed outside of the simplified booth 48.

Also in this embodiment, motor current is monitored in order to prevent the release of acidic gas due to insufficient neutralization. In case rotation speed of the motor decreases or the motor stops the rotation, bubbles supplied from the blow tube 45 may not be broken down sufficiently, resulting in insufficient neutralization. To prevent such a trouble, the motor 52a is provided with a motor monitor 52e that detects rotation failure by means of the motor current. Output of the motor monitor 52e is sent to the controller 61 so that, when the rotation speed of the motor decreases or the motor stops the rotation, the controller 61 causes an alarm device to work and stops the decomposition process, thus preventing the acidic gas from being released out of the system.

The alarm device may be of any type as long as personnel nearby can be alerted and, for example, a flashing lamp or sounding may be employed.

Although the motor current is monitored in this embodiment to detect a decrease in the rotation speed or stopping of the motor, other means may be also employed as long as a decrease in the rotation speed or stopping of the motor can be detected.

The controller 61 receives signals from various sensors such as the pressure switches 23, 33, the thermocouples 36, 54, the level switches 27, 56 and the optical sensor 17, thereby constantly monitoring the pressures of the argon gas and CFC gas supplied to the heater 18, liquid level in the water tank 26, condition of the plasma, temperature and liquid level in the waste gas processing tank 41. When any of these signals deviates from a permissible range, there is a possibility that the operation is not going on normally, and therefore the operation is stopped.

When the operation is stopped, the air is supplied as described above to purge the residual gas from the apparatus for safety.

Should the reactor tube 15 be corroded and the acidic gas leaks out of the reactor tube 15, the simplified booth 48 prevents the acidic gas from escaping to the outside of the system. Since the simplified booth 48 prevents the acidic gas from diffusing while the blower 43 draws the gas and, at the same time, the gas leakage sensor 49 is installed in the draft path, leakage of gas is detected reliably. When the gas leakage sensor 49 detects gas leakage, the controller 61 causes alarm device to work and stops the decomposition process. The blower 43 also stops running. Thus the acidic gas is never released to the outside of the system.

[Embodiment 4]

Figure 13:
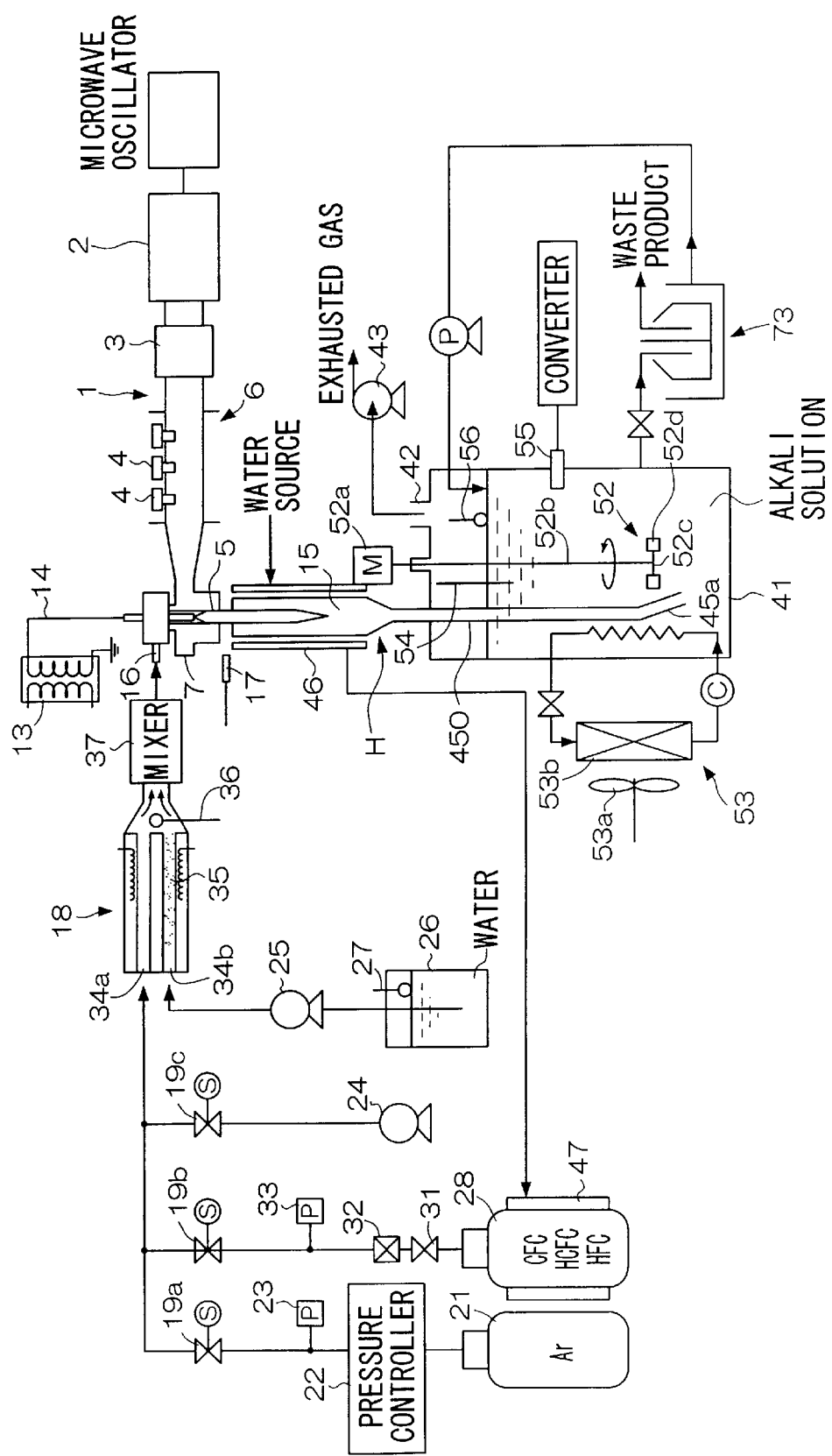
FIG. 13 is a block diagram showing another embodiment of the decomposition apparatus according to the present invention.
Figure 14:
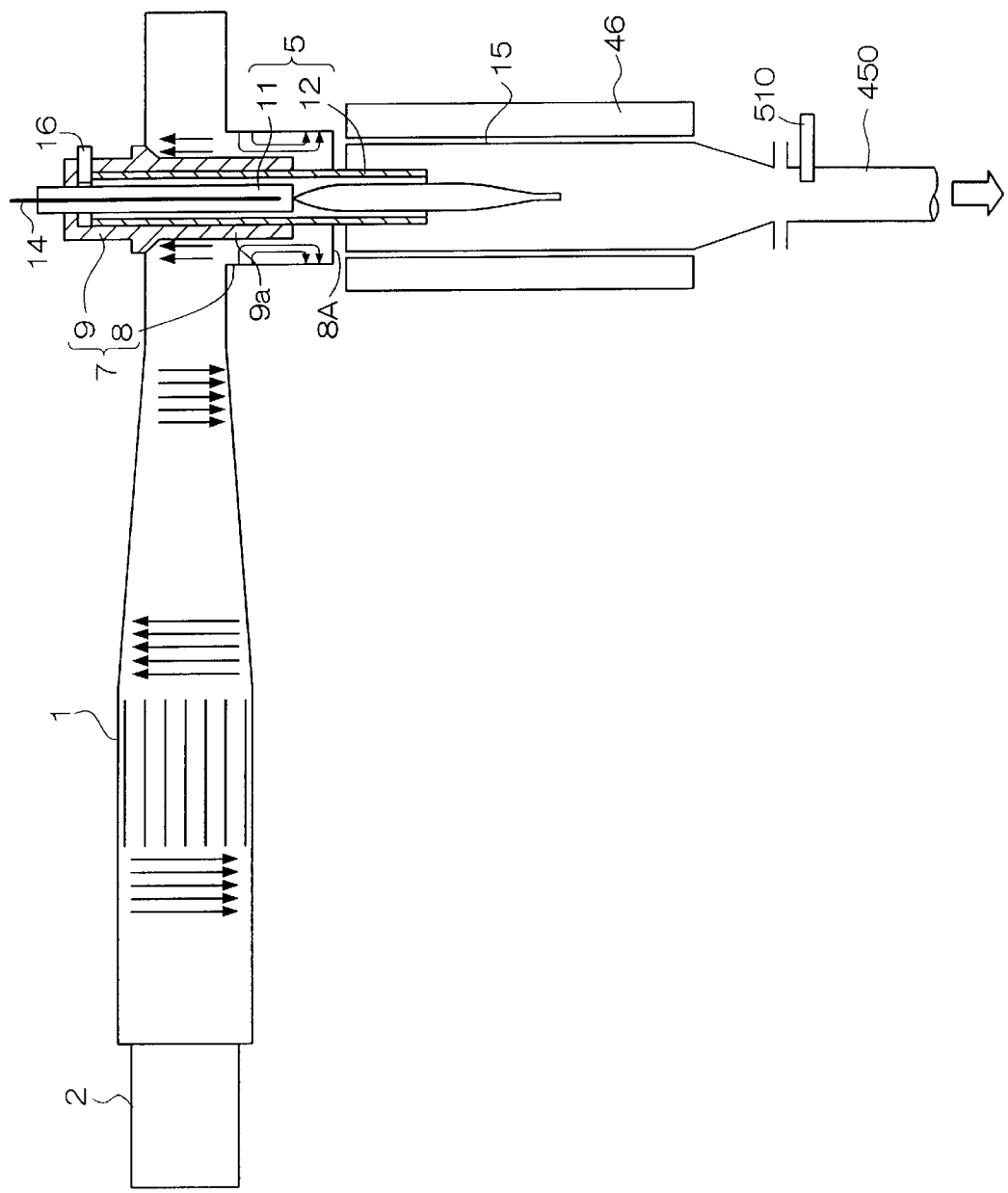
FIG. 14 is a sectional view showing a reactor of the decomposition apparatus.

FIG. 13 and FIG. 14 show another embodiment of the present invention. Components identical with those of the first embodiment will be identified by the same reference numerals and description thereof will be omitted.

While the reactor shown in FIG. 3 has the blow tube 45 connected via the detachable joint 44 to the reactor tube 15, upper end of a blow tube 450 is connected directly to the reactor tube 15 in the reactor of this embodiment, and a cooling water discharge nozzle 510 (cooling liquid discharge device) is installed at the top end of the blow tube 450. The blow tube 450 is longer than the blow tube 45 of FIG. 3 by the length of the detachable joint 44. Except for the above, the constitution of this embodiment is the same as that shown in FIG. 3. In the reactor of this embodiment, although the detachable joint is not provided, the blow tube 450 is quickly cooled down to within the tolerable temperature range by cooling water discharged from the cooling water discharge nozzle 510 into the top end thereof. Therefore, the blow tube 450 may be made of a resin such as Teflon (registered trade mark), thereby elongating the service life of the reactor H and reducing the equipment cost and maintenance cost.

Four preferred embodiments have been described above, but the organohalogen compound decomposition apparatus of the present invention is not limited to these embodiments and components may be interchanged between the embodiments or may be changed as follows.

(1) As means for accelerating the mixing in the mixer 37, inside of the mixer 37 may be filled with beads or the like, instead of using the orifice 38. In this constitution, since the CFC and other gas and steam flow randomly through narrow spaces formed in the mixer 37, mixing is accelerated.

Also a plurality of baffle plates may be installed on the inner circumferential surface of the mixer 37 at intervals vertically or horizontally (static mixer). In this constitution, since the CFC and other gas and steam flow while meandering, mixing is accelerated.

The pipe connected to the inlet of the mixer 37 may also be inclined with respect to the direction of flow, while a guide plate is installed on the inner circumferential surface of the mixer to extend spirally (swirling mixer). In this constitution, since the CFC and other gas and steam flow while turning spirally, mixing is accelerated.

(2) Instead of the pH value of the alkali solution, motor current may also be monitored to prevent the release of acidic gas to the outside of the system due to insufficient neutralization. In case rotation speed of the motor decreases or the motor stops the rotation, bubbles supplied from the blow tube 45 may not be broken down sufficiently, resulting in insufficient neutralization. When rotation failure of the motor is detected by means of the motor current and the operation of the decomposition apparatus is stopped by a command from the controller 61, the release of acidic gas to the outside of the system can be prevented.

(3) The inside of the reactor tube 15 is kept always dry and is therefore not likely to be corroded by the acidic gas generated in the decomposition reaction of the scheme (1). However, in order to improve safety further, a simplified booth may be installed to enclose the reactor tube 15 while an exhaust gas sensor that detects $CO_2$ gas, CO gas and other gas is installed between the booth and the reactor tube 15. In this constitution, corrosion of the reactor tube 15 can be constantly monitored by the controller 61 by means of the exhaust sensor. Should the reactor tube 15 be corroded and the gas generated in the decomposition reaction of the scheme (1) leaks out of the reactor tube 15, the controller 61 commands to stop the operation of the decomposition apparatus. At the same time, the product gas that has leaked is drawn thereby preventing the acidic gas from being released to the outside of the system. The blower 43 installed in the exhaust duct 42 may also be used for drawing the gas.

(4) Slurry in the waste gas processing tank 41 settles when left to stand over night after stopping the operation. Thus concentrated slurry that has settled may be taken out by a pump and the liquid may be separated from the solid component which is then disposed of. In this case, since only the concentrated slurry is taken out without mixing with the alkali solution, the slurry can be processed with high efficiency. The settling time can be reduced and the slurry can be processed more efficiently by adding a granulating agent, coagulant or the like to the alkali solution in the waste gas processing tank 41 thereby increasing the size of the slurry particles.

(5) Instead of disposing the end of the Tesla coil 14 inside of the discharge tube 5, it may be placed outside the discharge tube 5 so as to ignite by spark discharge.

(6) Instead of heating the recovered CFC cylinder 28 to gasifying the CFC and extract the CFC gas, the recovered CFC cylinder 28 may be placed up side down to extract the recovered CFC in the state of liquid, while passing the CFC through a throttle such as differential pressure control valve thereby maintaining a constant flow rate, with the CFC then gasified and sent to the heater 18. In this case, fluctuation of the flow rate due to temperature drop can be restrained by heating the throttle and the piping.

(7) The recovered CFC cylinder 28 may be heated by the cooling water of the cooler 53 used in cooling the slurry in the waste gas processing tank 41, instead of the cooling water used in cooling the reactor tube 15.

(8) The distance by which the distal end of the inner tube 11 protrudes from the end of the probe antenna 9a inward is most preferably set to be equal to the distance between the end of the probe antenna 9a and the focus where the microwave energy is concentrated, as long as the inner tube 11 is not melted, although this distance may be changed in consideration of melting of the outer tube 12.

(9) The bubble breakdown device 52 may also include a screw having a propeller fastened at the distal end of the shaft thereof. The bubble breakdown device 52 may also have components 52b, 52c, 52d made of a resin such as Teflon that are fastened by screws. In this constitution, since there is no welded portion and the components 52b, 52c, 52d are made of resin material, extremely high resistance to corrosion is ensured.

(10) The neutralization solution stored in the waste gas processing tank 41 is not limited to the alkali suspension, and an alkali solution such as sodium hydroxide solution may also be used.

INDUSTRIAL APPLICABILITY

The decomposition method according to the present invention makes it possible to easily take out the neutralization product generated in the neutralization reaction, and improves the solid-liquid separation efficiency for the neutralization product and the alkali solution. This reduces the water consumption in the process of decomposing the organohalogen compound and makes efficient and stable supply of CFC gas and other gases possible.

What is claimed is:

1. A method of decomposing organohalogen compounds comprising the step of:
    (a) irradiating a gas containing the organohalogen compounds with microwave radiation to generate a thermal plasma;
    (b) reacting said organohalogen compounds with steam under conditions sufficient to decompose said organohalogen compounds and generate an acidic gas;
    (c) neutralizing said acidic gas thus formed with an alkali solution to generate a neutralization product;
    (d) allowing said alkali solution to stand for sufficient time to allow said neutralization product to precipitate in the alkali solution; and
    (e) removing said precipitated neutralization product.

2. The method according to claim 1 which further comprises interrupting the reaction of the organohalogen compounds with steam; repeating step (c) with the acidic gas thus formed to generate said neutralization product; precipitating and removing said neutralization product; restarting the reaction of the organohalogen compound with steam, generating acidic gas and repeating steps (c), (d) and (e).

3. A method of decomposing organohalogen compounds according to claim 1, further comprising:
    removing said precipitated neutralization product and recovering the alkali solution for re-use in a subsequent neutralization reaction.

4. A method of decomposing organohalogen compounds according to claim 1, wherein said alkali solution is a suspension.

5. A method of decomposing organohalogen compound according to claim 4, wherein said alkali solution is a suspension containing 20% by weight of $Ca(OH)_2$.

6. A method of decomposing organohalogen compounds according to claim 1, which further comprises dispersing said acidic gas into fine bubbles when said acidic gas is neutralized.

* * * * *